United States Patent [19]

Wesselski et al.

[11] Patent Number: 4,757,767

[45] Date of Patent: Jul. 19, 1988

[54] MOBILE REMOTE MANIPULATOR SYSTEM FOR A TETRAHEDRAL TRUSS

[75] Inventors: Clarence J. Wesselski, Alvin; William C. Schneider, Houston, both of Tex.

[73] Assignee: The United States of America as represented by the Administrator of the National Aeronautics and Space Administration, Washington, D.C.

[21] Appl. No.: 904,134

[22] Filed: Sep. 5, 1986

[51] Int. Cl.⁴ ............................................. B61J 1/10
[52] U.S. Cl. .................................... 104/49; 104/35; 104/172.1; 244/159
[58] Field of Search ................... 244/159; 104/49, 88, 104/35, 165, 287, 172.1, 172.2, 96, 99, 173.1

[56] References Cited

U.S. PATENT DOCUMENTS

| | | | |
|---|---|---|---|
| 460,959 | 10/1891 | Ferris . | |
| 2,785,809 | 3/1957 | Riblet | 104/35 |
| 2,943,579 | 7/1960 | Bel Geddes | 104/94 |
| 3,094,941 | 6/1963 | Hellner | 104/130 |
| 3,253,552 | 5/1966 | Stein | 104/94 |
| 3,273,727 | 9/1966 | Rogers et al. | 214/16 |
| 3,356,040 | 12/1967 | Fonden | 104/172.1 X |
| 3,478,859 | 11/1969 | Krempel et al. | 198/465.1 |
| 3,610,525 | 10/1971 | Townsend et al. | 104/35 X |
| 3,672,307 | 6/1972 | Richins | 104/96 |
| 3,709,381 | 1/1973 | Sullivan et al. | 214/11 R |
| 3,845,718 | 11/1974 | Rogers et al. | 104/130 |
| 3,879,799 | 4/1975 | Williams | 16/89 |
| 4,217,070 | 8/1980 | Groger | 414/239 |
| 4,243,147 | 1/1981 | Twitchell et al. | 104/172.1 X |
| 4,273,053 | 6/1981 | Gibbs | 104/88 X |
| 4,372,219 | 2/1983 | Gibbs | 104/165 |
| 4,579,302 | 4/1986 | Schneider et al. | 244/159 |

FOREIGN PATENT DOCUMENTS

| | | | |
|---|---|---|---|
| 262295 | 2/1960 | Australia | 104/35 |
| 1638 | 5/1979 | European Pat. Off. | 104/35 |
| 2030533 | 4/1980 | United Kingdom | 104/172.1 |

OTHER PUBLICATIONS

"A Mobile Work Station Concept for Mechanically Aided Astronaut Assembly of Large Space Trusses", NASA Technical Paper 2108, Mar. 1983, Walter L. Heard, Jr., Harold G. Bush, Richard E. Wallsom, and J. Kermit Jensen.

"Space Station Reference Configuration Description", JSC-19989, Systems Engineering and Integration, Space Station Program Office, Aug. 1984, National Aeronautics and Space Administration, Lyndon B. Johnson Space Center, Houston, Texas.

Primary Examiner—Kenneth J. Dorner
Assistant Examiner—Laurie K. Cranmer
Attorney, Agent, or Firm—Russell E. Schlorff; John R. Manning; Edward K. Fein

[57] ABSTRACT

A mobile platform (B) for transit about a working face (51) of a truss. The truss has a grid of node guide pins (54) having stationary sprockets (54D). The platform (B) has a rail system (52) comprised of transversely disposed T-shaped tracks (60), direction changing means (58) at their intersections and retractable, reversible chain drive systems (22). The chain drive (22) selectively engages the sprockets (54D) of the guide pins (54) providing selective movement of the platform (B) in two orthogonal directions (L and T). The present invention provides a near-uniform traversing velocity with minimal dynamic loading on the system. Pivoting changers (C1 and C2) move the platform (B) from one face (51) to another.

19 Claims, 7 Drawing Sheets

MOBILE REMOTE MANIPULATOR SYSTEM FOR A TETRAHEDRAL TRUSS

ORIGIN OF THE INVENTION

The invention described herein was made by employee(s) of the U.S. Government and may be manufactured and used by or for the Government of the United States of America for governmental purposes without the payment of any royalties thereon or therefor.

BACKGROUND OF THE INVENTION

1. Field of the Invention.

This invention relates generally to a material handling system and more particularly to a mobile platform for the transportation of goods and personnel on the trusses which serve as work areas on a space station.

2. Description of Related Art.

The most closely related device has been studied by Langley Research Center of the National Aeronautics and Space Administration (NASA). This device walks on nodes and employs stationary tracks on the mobile platform itself. It utilizes a push-pull device to provide movement. See NASA TP 2108, entitled "A Mobile Work Station Concept for Mechanically Aided Astronaut Assembly of Large Space Trusses", dated March 1983 and JSC-19989, entitled "Space Station Reference Configuration Description", dated August 1984, pages 622–636. The disadvantage of this device is that since it uses a push-pull system for mobility, it is apparent that the traversing velocity will be non-uniform and can be changing abruptly at the start and end at each stroke. If the system is carrying large massive items such as modules, dynamic loading in the arms of the remote manipulator system can be very significant.

Other related devices comprise the following patents:

Gibbs—U.S. Pat. No. 4,372,219—a cart having orthogonally disposed wheels and means to maneuver in two directions upon a two-dimensional grid of rails;

Groger—U.S. Pat. No. 4,217,070—system for placing items, such as motor vehicles in garages, having shiftable carrying plates and occupying a plurality of respective carrying plate positions arranged throughout the available area in rows, which are transverse to each other and at right angles to each other.

Williams—U.S. Pat. No. 3,879,799—multidirectional suspension system for operable partitions having an overhead track defining a pair of vertically spaced roller-way defining ledges disposed on either side of the track, and carriers for suspending the partition panels from the track, with each carrier being in the form of a pendant bolt operating between the track ledges and having coaxially journaled thereon for rotation thereabout a pair of discs each defining a downwardly facing load support side surface, and with the load support side surfaces of one of the discs riding on one of the ledges free of contact of the other ledge, and the other of the ledges free of contact of the first ledge.

P. Rogers et al.—U.S. Pat. No. 3,845,718, a car for a tracked transporter system, supported upon wheels each of which is mounted so that it can swivel about an upright axis and one or more of which are drivable by a poser unit carried upon the car, the car being further provided with automatically actuated steering means in the track of the system and operative for imparting swiveling movement to the said wheels to cause the car selectively to follow predetermined routes or courses in the said system.

Sullivan et al.—U.S. Pat. No. 3,709,381—an article transporting system made up of a large number of individual modules, each of which is a complete and independent conveyor within itself.

Richins—U.S. Pat. No. 3,672,307—a load handling vehicle equipped with a steering and traction wheel and an overhead guide assembly co-acting with fixed overhead linear tracks.

Fonden—U.S. Pat. No. 3,356,040—a driving means for use in conveyor systems in which a rotating shaft is employed for the driving of trucks that move on tracks.

C. Rogers et al.—U.S. Pat. No. 3,273,727—an apparatus for the horizontal handling of a load, adaptable for remote control, having a floor, a pallet for use in conjunction with said floor, means for providing a fluid film between said pallet and said floor, and means for propelling said pallet over said floor.

Stein—U.S. Pat. No. 3,253,552—a system having a horizontal ceiling track in a movable wall, including parallel, spaced apart planar support members, a wall panel, and a trolley system which supports said wall panel or a movable load and which cooperates with overhead tracks.

Hellner—U.S. Pat. No. 3,094,941—track system consisting of parallel spaced rails having support surfaces extending substantially parallel with the plane of said track system, adapted to support a movable carriage thereon.

Bel Geddes—U.S. Pat. No. 2,943,579—a stage light suspended from and moveable with respect to a two-dimensional ceiling grid, such that the suspension uses two pairs of ball bearing rollers which are held by slotting rails.

Ferris—U.S. Pat. No. 460,959—a hay-carrier track having a slotted rail which engages a supporting pin.

The systems described in patents such as Hellner, P. Rogers et al., Bel Geddes, Stein, Williams, and Richins require the placement of rails or tracks along or above the desired path of travel, thus reducing the useful surface area of the object upon which the rails are placed. However, the Mobile Remote Manipulator System (referred hereafter as the "MRMS") of the present invention requires no rail placement on or above the surface of travel, but instead travels along a grid of guide pins which are located at the intersections of the elements forming the truss. These guide pins allow for transit about a work plane while freeing the overwhelming majority of the surface area and exterior for other uses.

Additionally, the MRMS of the present invention avoids the two-dimensional movement limitations of Hellner, Stein and Williams, which allow only horizontal motion, and have no self-propulsion Unlike P. Rogers et al., C. Rogers et al., Sullivan et al., Groger, Stein, Williams, Richins and probably Hellner, the MRMS of the present invention may propel itself at near-uniform velocity, in longitudinal or transverse directions and in three-dimensional space onto planes at a plurality of angles relative to one another. Unlike Williams, the MRMS of the present invention may remain in place on the surface of a truss, for instance, irrespective of gravity.

Unlike Richins, the MRMS of the present invention requires contact with only one planar surface at one time. P. Rogers et al., C. Rogers et al., Sullivan et al., Groger and perhaps Hellner teach systems which allow a moving platform or other object to move in two orthogonal directions, while implicitly depending upon the force of gravity to secure the platform to the surface. However, the MRMS of the present invention employs guide pins which allow a platform to remain secured to the surface while being transported in either longitudinal or lateral directions and onto planes at a plurality of angles relative to one another, in three-dimensional space.

Additionally, Fonden, C. Rogers et al., Sullivan et al., Groger and perhaps Hellner require equipment to enable both the translation and direction changing of the platform. However, because all the propulsion and direction changing equipment is located within the platform system element in the MRMS of the present invention, there is no need to occupy the surface upon which the platform travels with equipment other than guide pins.

SUMMARY OF THE INVENTION

The Mobile Remote Manipulator System (MRMS) of the present invention generally comprises a moving platform for transit about a grid of node guide pins attached to the working face of a truss. The platform has a rail guide system and a reversible chain drive system, attached to its underside. The rails are formed with T-shaped slots to engage the specially designed guide pins to allow the platform to slide along the guide pins in either a longitudinal or transverse direction. The platform may stop and change direction to travel in a direction at right angles to the previously travelled direction by rotation of a direction changer which is part of the rail system. The platform is propelled along the grid by engagement of the chain drive with the sprockets on the guide pins.

Pivoting platforms may be mounted on the truss structure to allow the mobile remote manipulator system to change work planes.

The primary advantage of the present invention is that the continuous motion drive system reduces dynamic loading on the cargo and handling equipment. The basic concept of the present invention is particularly adapted for use on a truss type structure; however, the present invention may also be used with any large planar surface structure having a grid of guide pins.

DESCRIPTION OF THE PREFERRED EMBODIMENT(S)

Figure 1:
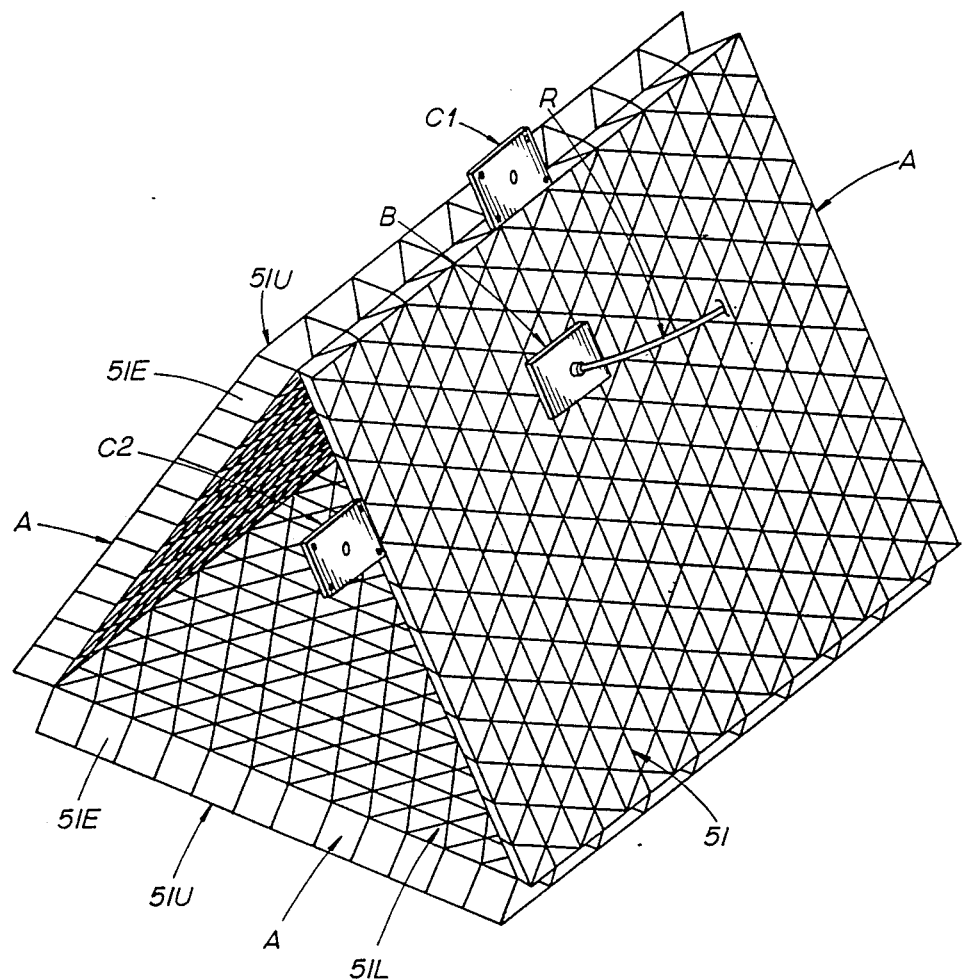
FIG. 1 is schematic view of the Mobile Remote Manipulator System (MRMS) shown mounted on a tetrahedral panel of a delta space station.

FIG. 1 shows a delta space station formed of tetrahedral trusses A. The delta space station is fully disclosed in U.S. Pat. No. 4,579,302 dated 1 Apr. 1986, and entitled "Shuttle-Launch Triangular Space Station." Each truss A includes a face or working surface 51 such as upper and lower working surfaces, 51U and 51L respectively, and end surface 51E. A moving platform system B of the present invention is shown on the upper surface 51U and provides support for a remote manipulator system R. A plurality of pivoting changing platforms C1 and C2 are shown extending between two trusses A, such as platform C1, or extending from the end surface 51E, such as platform C2. The platforms C1 and C2 are used to transport the moving platform system B from one working surface 51 to another as will be more fully set forth below.

Figure 2:
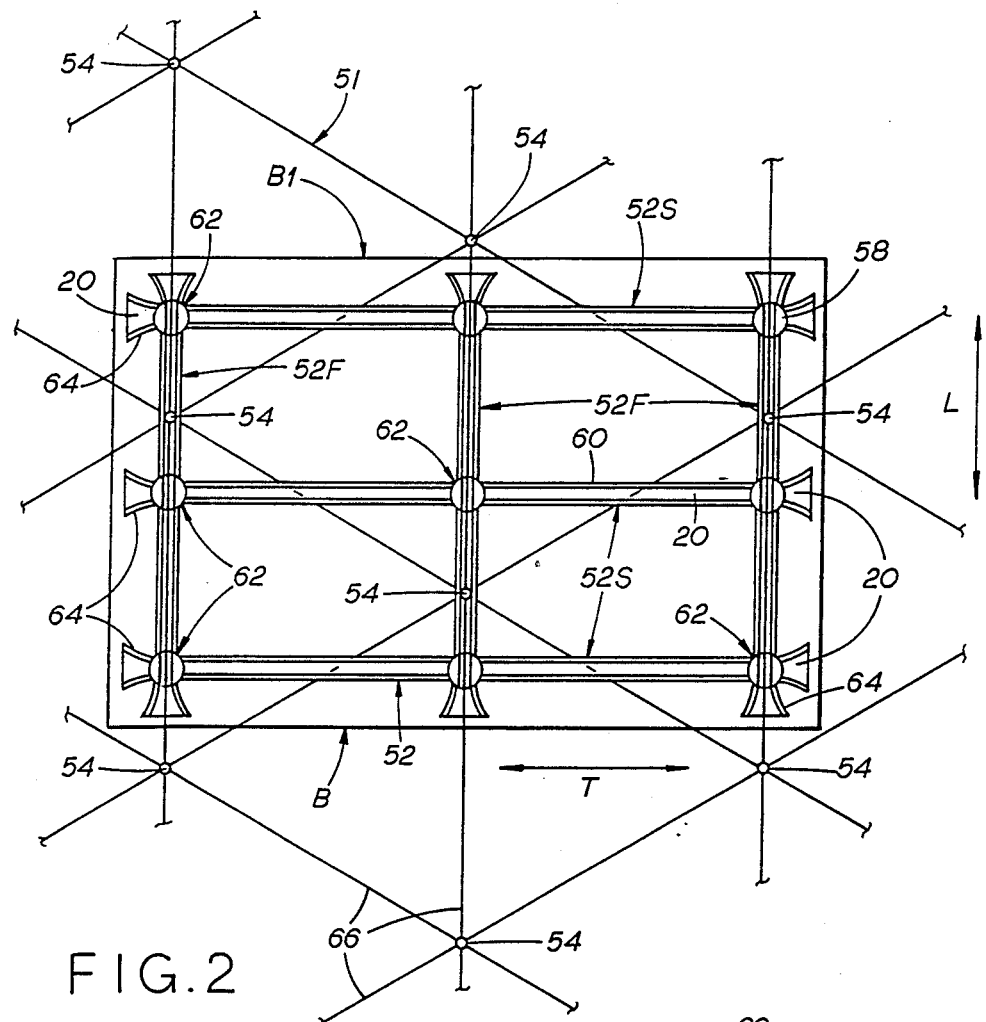
FIG. 2 is a planar view of the rail system attached to the underside of the MRMS platform with a schematic of the grid of guide pins with which the rail system cooperates.
Figure 4:
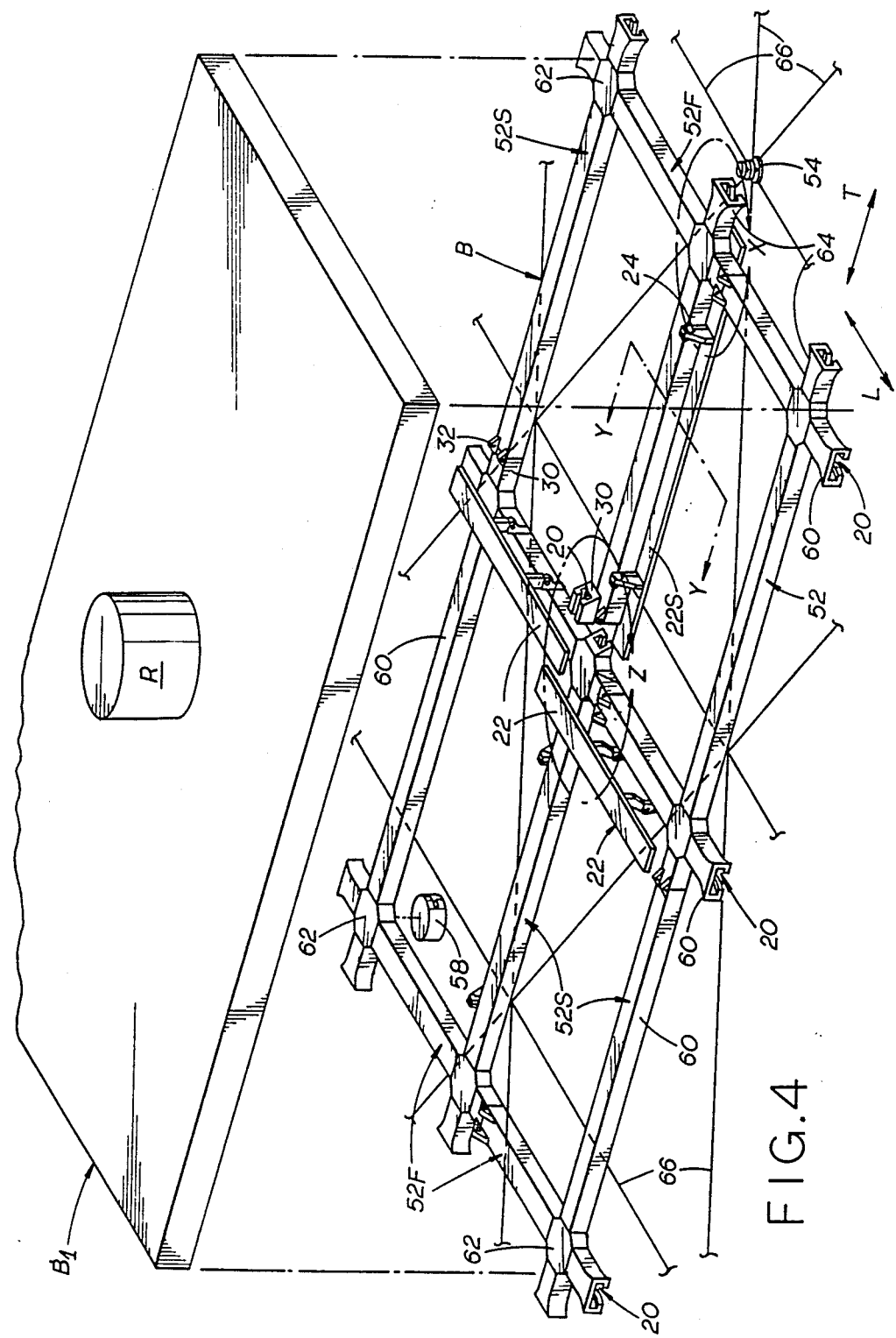
FIG. 4 shows a partial exploded view of the MRMS, with the rail and drive system, the guide pins and sprockets, the disengagement sequence, and the direction changers.
Figure 7:
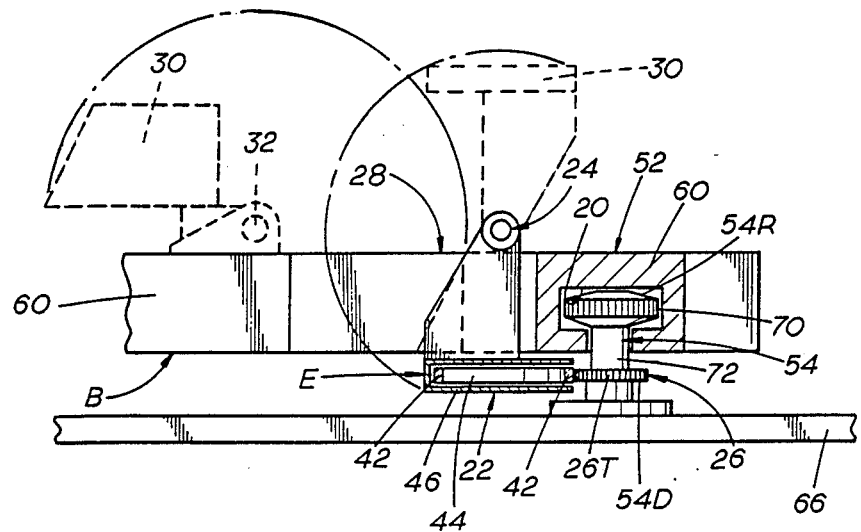
FIG. 7 shows SECTION Y—Y of FIG. 4, a schematic for chain drive engagement and disengagement.

As is best shown in FIGS. 2 and 4, the mobile remote manipulator system of the present invention includes a grid of guide pins 54 extending from a supporting planar surface, such as the working surface 51. The plurality of guide pin means 54 extend in a uniform pattern from the supporting planar surface 51 for guiding movement in a plane parallel to and slightly spaced apart from the supporting planar surface 51. The guide pins 54 are formed having a rail engagement end 54R and a drive engagement portion 54D as shown in FIG. 7.

As can be seen in FIG. 4, for movement of the platform B about the grid of guide pins 54, the platform B has a rail guide system 52 and a reversible chain drive system 22 attached to its underside. The rails 60 are formed having T-shaped -slots 20 to engage the rail engagement end 54R of the guide pins 54 allowing the platform to slide along the guide pins in either a longitudinal L or transverse direction T.

In FIG. 2 three parallel first rail or track means 52F engage three guide pins 54. The first rail means 52F are aligned along the first of the two orthogonal directions of travel L. Similarly, the three parallel second rail or track means 52S would engage three guide pins 54 for travel along the second of the two orthogonal directions of travel T. The first rail means 52F and the second rail means 52S intersect at right angles to each other forming the essentially planar, movable rail system 52 which is so proportioned relative to the grid of guide pins 54 that when positioned to move in one direction no guide pins are engaged by the other rail means, as seen in FIG. 2.

Figure 3:
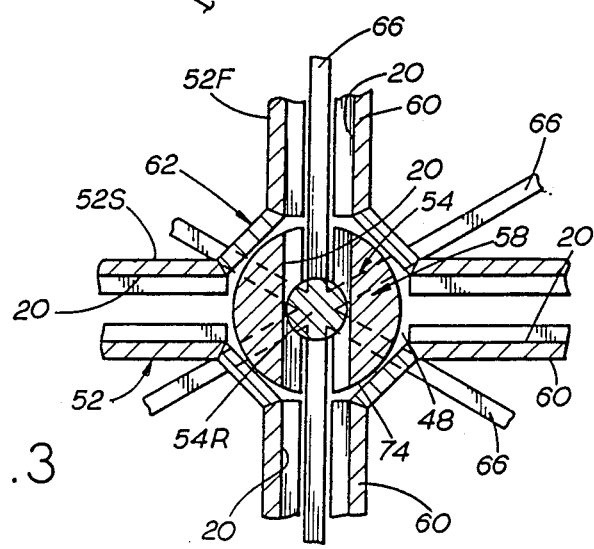
FIG. 3 shows a cross-sectional view through a direction changer, relative to a guide pin and truss juncture.

As shown in FIG. 3, node direction changing means 58 are located at each intersection of the first rail means 52F and the second rail means 52S, for controllably directing the movement of platform B relative to said grid of guide pins 54 from one rail means to the second orthogonally intersecting rail means at the rail junctions 62.

As shown in FIG. 4, at least one first propulsion means 22F is mounted with the first rail means 52F for selectively engaging the drive engagement portion 54D of at least one guide pin 54 that has been engaged by the first rail means 52F and moves the first rail means 52F relative to the engaged guide pin 54. The first propulsion means 22F extends the length of the first rail means 52F to continuously engage a guide pin 54 along the complete path of the relative movement of the guide pin 54 from one node direction changer 58 to the next node direction changer 58 encountered by the guide pins 54. Similarly, at least one second propulsion means 22S is mounted with the second rail means 52S for selectively engaging the drive engagement portion 54D of the guide pins 54 that have been engaged by the second rail means 52S and moves the second rail means 52S relative to the engaged guide pins 54. The second propulsion means 22S extends the length of the second rail means 52S to continuously engage a guide pin 54 along the whole path of the relative movement of the guide pin 54 from one node direction changer 58 to the next node direction changer 58 encouhtered by the guide pins 54. The first propulsion means 22F and second propulsion means 22S are positioned in a somewhat overlapped manner such that either the first propulsion means 22F or the second propulsion means 22S can selectively engage a single guide pin 54 when such single guide pin is positioned within the node direction changing means 58 located at the inter section 62 of the first rail means 52F and the second rail means 52S, each of which have the propulsion means mounted thereto. The overlap of the propulsion means provides for the change in orthogonal directions of movement, such as from L to T or vice versa.

As shown in FIG. 2, the guide pin means 54 provide for movement of the platform B in either a longitudinal L or transverse T direction in a plane parallel to and spaced apart from the plane created by the working surface 51, shown in FIG. 1. Preferably, the guide pins 54 are removable from the support surface 51 in order that they may be mounted on those portions of the work surface 51 to which access is desired and removed from those portions of the work surface 51 that are no longer needed. In a truss arrangement, such as is shown in FIG. 1, the guide pins 54 are mounted at the intersection of the truss elements 66 that form the truss segments.

As shown in FIG. 7, the rail engagement portion 54R of the guide pins are formed with a mushroom shaped, flared, or bulbous head portion 70 on top of a shank 72 which is positioned in the T-shaped slot 20 of the rail means 52. The drive engagement portion 54D of the guide pins 54 include sprockets extending in a generally radial fashion from the shank portion 72 of the pin. Alternatively, the rail engagement portion 54R may include known friction reducing means such as bearings or rotating wheels to reduce friction caused by movement between the guide pins 54 and the rails 52 at any contact points.

The rail means 52 generally comprise track or rail segments 60 of a desired length having a T-shaped cavity or slot 20 extending the length of the longitudinal axis of the rail means 52 (shown in FIG. 2). The T-shaped slot 20 communicates the head portion 70 from one end of the track 60 to the other end. The T-shaped slot 20 cooperating with the head 70 prevent the disengagement of the rail engagement portion 54R from the rail means 52.

Figure 5:
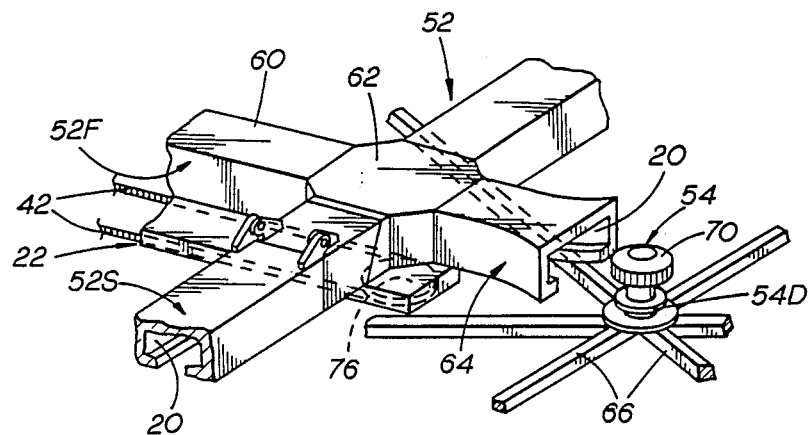
FIG. 5 shows VIEW X of FIG. 4, the engagement of guide pins into rails.

As shown in FIG. 4 and FIG. 5, the T-shaped tracks 60 at the open side edges 64 of the rail system or track grid 52, have "T" slots 20 cut in them which are flared at each end for easy engagement with the guide pins 54 as the track grid 52 moves toward and engages the guide pins 54.

The length of each track segment 60 is determined by the size of the pattern of the guide pins 54. As is best seen in FIG. 2, tracks 60 are assembled into the track grid 52 in such a way that the guide pins 54 engage the rail means 52F and 52S in either direction of travel L or T. A closer pattern of guide pins would thus require shorter distance between rails 60.

FIG. 2 shows a typical track grid 52 attached to the underside of the platform B that has engaged or captured three guide pins 54 in the first rail means 52F. The track grid 52 includes three parallel first rail means 52F and three parallel second rail means 52S and nine node direction changing means 58 located at each of the nine rail junctions 62.

As shown in FIG. 3 and FIG. 4, in order to change directions, the platform system B is stopped by conventional means such that the node direction changing means 58 have captured or engaged and rest over the desired guide pins 54. The direction of movement is changed by the action of a known actuator or gear and pinion drive 74 which rotates all of the direction changers 58 ninety (90) degrees in unison. At the rail junctions 62 (FIG. 3), there is a cylindrical cavity 48 into which the direction changer 58 fits. The direction changer 58 generally comprises a block having similar T-shaped slots 20 therein to engage the rail engagement portion 54R and communicate the rail engagement portion 54R from the T-shaped slot 20 of one track to the T-shaped slot 20 of an adjoining intersecting track 60. The changer must rotate only back and forth through 90 degrees.

Figure 6:
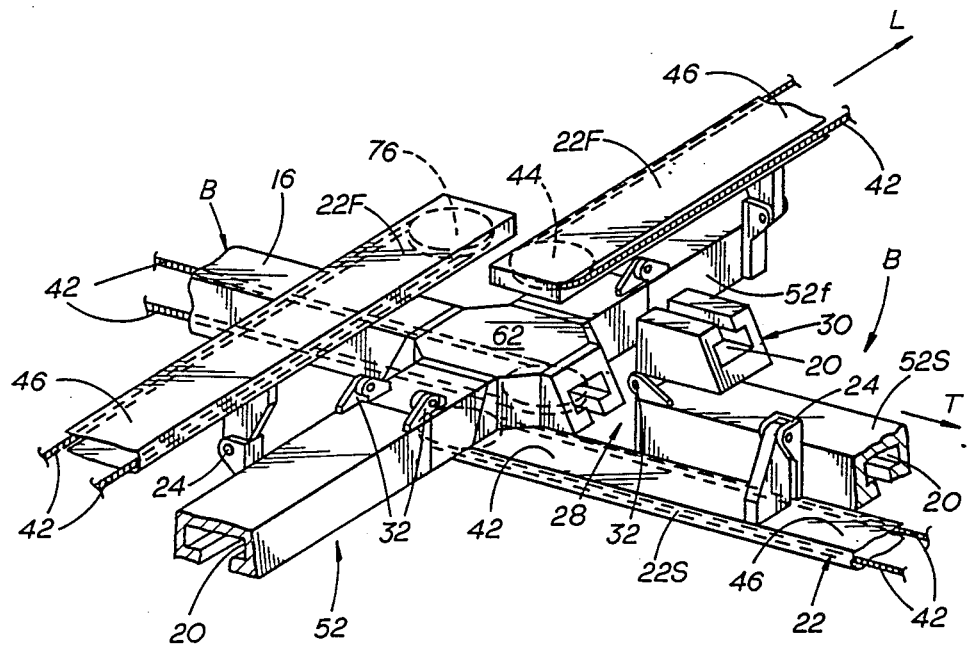
FIG. 6 shows VIEW Z of FIG. 4, a rail segment pivot.
Figure 8:
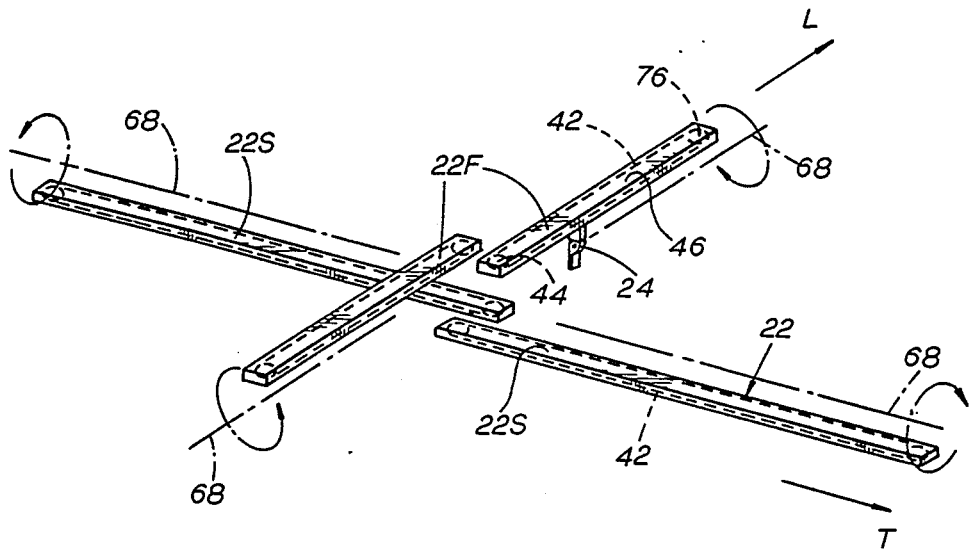
FIG. 8 shows a schematic of chain drive conversion to longitudinal travel.
Figure 9:
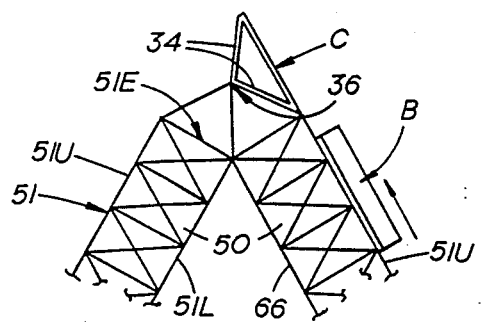
FIGS. 9 through 12 show a schematic of transfer around the apex of two tetrahedral panels.
Figure 10:
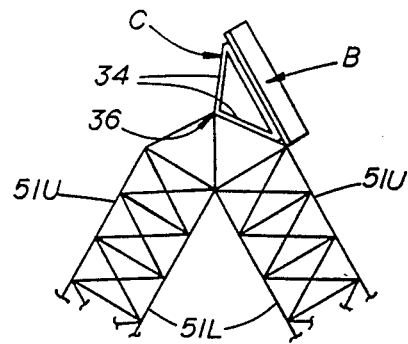
Figure 11:
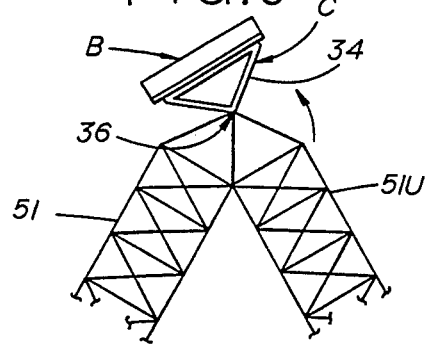
Figure 12:
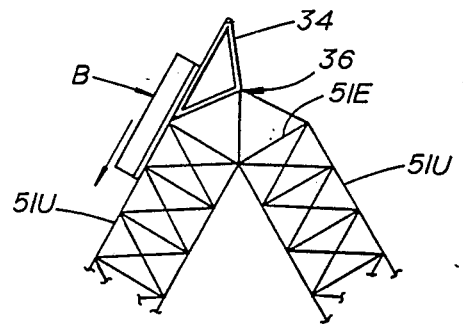
Figure 13:
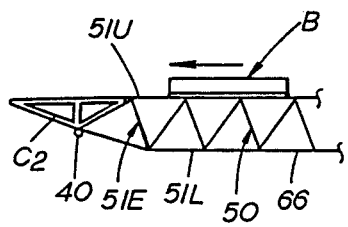
FIGS. 13 to 16 show schematics of the transfer around the edge of tetrahedral panels.
Figure 14:
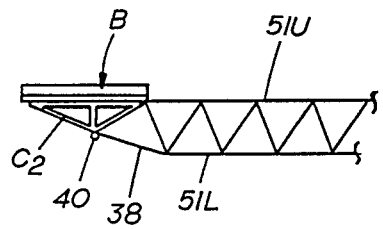
Figure 15:
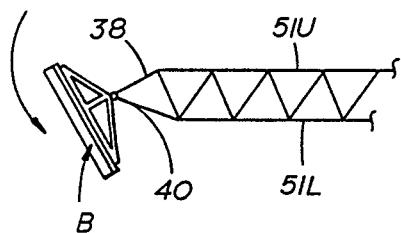
Figure 16:
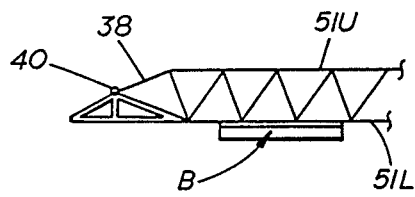

As shown in FIG. 6 and FIG. 8, there are two sets of two overlapping propulsion means or chain drive systems 22, which pivot up or down about axes of rotation 68 on hinges 24, and are preferably located on opposite sides of the tracks 60. Generally the propulsion means 22 include a continuous loop chain or belt 42 extending around two rotation points or pulleys 44. A known chain drive motor 76 may be attached to one of the rotation points to provide the energy to turn the belt 42. Such motor 76 is preferably a reversible motor that maintains the chain belt 42 rotating at a constant rate. Chain drive boxes 46 cover the drive or propulsion means while providing contact between the belt 42 and the drive engagement portion 54D of the guide pins 54.

As is best shown in FIG. 5 and FIG. 7, the chain drive systems 22 propel the platform system B along the grid of guide pins 54, which guide pins contact a chain drive system 22 by way of an engagement sprocket 26 having teeth 26T extending from the shank 72 of pin 54 forming the drive engagement portion 54D. In order that more teeth 26T could be engaged by the chain drive 22, the engagement sprocket 26 could alternatively be square in shape.

As shown in FIGS. 5 through 8, as the platform system B moves, one set of the propulsion means 22S to engage the guide engagement sprocket 26, while the other set, such as 22F, remains in a disengaged position. Each chain drive system 22F or 22S is used alternately for the desired longitudinal or transverse movement. As is shown in FIG. 8, both the first and second propulsion means 22F and 22S are synchronized so they will not interfere with each other as the chain drive systems 22 are switched into and out of engagement with the guide pins. When the direction of movement of the platform system B is changed, the two sets 22F and 22S of chain drive systems 22 are reversed. As shown in FIG. 6 and FIG. 7, to disengage, a propulsion means 22 is rotated by conventional means 180 degrees clockwise about a hinge 24. At the same time, gaps 28 are opened in the tracks 60, which are perpendicular to the changed direction of movement of the platform system B, by pivoting rail segments 30 by conventional means about a rail hinge 32 to permit passage.

The direction changing sequence is summarized as follows:
A. direction changers rotated 90 degrees.
B. pivoting rail segments rotated up and out of the way.
C. chain drive boxes rotated 180 degrees.
D. pivoting rail segments pivoted back down into normal position.

As shown in FIG. 1 and FIGS. 9 through 12, pivoting platforms C allow the moving platform system B to change work planes on a truss structure such as truss platform A where six resultant work platform faces exist. In addition to supporting braces 34 for pivoting, the pivoting platforms C have the same basic, uniform grid of guide pins 54 mounted so that the moving platform system B can be driven onto the pivoting platforms C. For transfer between two outer planes 51U, the combination of the platform system B and the outer pivoting platform C1 is pivoted 120 degrees about a tripod junction 36 on the end 51E of the working surface 51 at which position the platform system B can transfer onto the adjacent plane 51U. As shown in FIGS. 13 through 16, for transfer from an outer plane or upper working surface 51U to an inner plane or lower working surface 51L, the inner pivot platform C2 rotates 180 degrees about a bi-segment junction 38 at an end 51E of the working surface 51 and translates along the axis of rotation 40 to align the guide pins 54.

Figure 17:
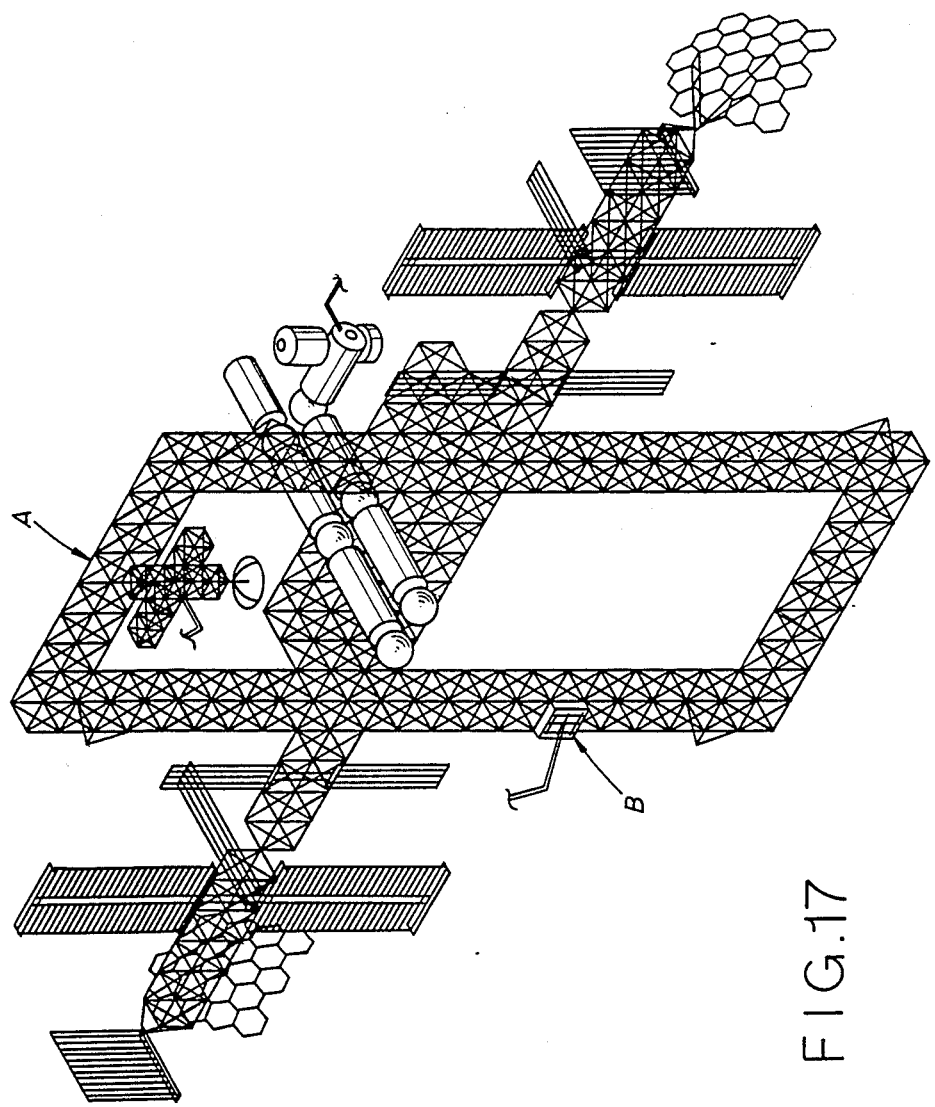
FIG. 17 is a schematic view of a dual keel space station, including the MRMS.

FIG. 17 is an embodiment of a dual keel space station showing the platform B moving about the work surfaces. As previously mentioned, the present invention will provide transportation on any planar structure which is provided with a properly positioned set of guide pins.

OPERATION

Even when the face members of the truss platform A lie in planes at zero degrees, 120 degrees and 240 degrees from one another, the MRMS moves in two orthogonal directions in each of the planes. As shown in FIGS. 7 and 8, the MRMS is propelled by retractable chain drives or propulsion means 22 which rotate at a constant rate and are each powered by a known reversible motor 76. The continuous loop chains 42 of the chain drive system engage the stationary sprockets 26 located on the guide pins 54 to propel the platform B along the desired direction of travel. The sprockets 26 are the key elements for maintaining the motion of the MRMS. As shown in FIG. 2, at any one time, there is at least one guide pin 54 and sprocket 26 being engaged by a set of chain drive boxes 22B. Similarly, the track grid system 52 will engage a plurality of guide pins 54 at any one time. The guide pins 54 are removable from the supporting surface 51U or 51L, shown in FIG. 1, and can be placed only in the locations desired for travel.

Tracks 60 which are parallel to an engaged chain drive set guide the direction of travel along the path of engaged guide pins 54. The rotation of the engaged chain drive causes the track grid 52 to translate in the path of the tracks 60 at a near uniform traversing velocity. To change the direction of movement, the track grid 52 is stopped in such a way that a rail junction 62 rests above each of the engaged guide pins 54. As shown in FIG. 3, after the track grid 52 stops, direction changers 58, located within the rail junctions 62, rotate 90 degrees in unison, such that the track grid 52 is then free to translate in a direction 90 degrees from the previous direction of motion. As shown in FIG. 7, during the direction change sequence, rail sections 30 are rotated 180 degrees about the rail hinge 32 to create gaps 28 in the track 60 near the rail junction 62. Then all the previously engaged propulsion means 22F or 22S are rotated 180 degrees through the newly formed gaps, thus becoming disengaged. Soon thereafter, the propulsion means 22S or 22F, which was at first in a disengaged position, is then rotated 180 degrees into an engaged position, whereupon the rail sections 30 are pivoted to the original position through 180 degrees completing the transition.

As shown in FIG. 2, the coordination of engaging either the first propulsion means 22F or the second propulsion means 22S in conjunction with the direction changers 58 results in the movement of the track grid 52 across the uniform grid of guide pins 54 in a in either of the two orthogonal directions L or T in a step-wise fashion. The ultimate movement of the track grid 52 to any desired position is achieved by combining moves in the two orthogonal directions L and T.

In a configuration of a space station or structure such as that of FIG. 1 where six work platform faces exist, there are three outer work planes 51U and three inner work planes 51L. As is best shown in FIGS. 9 through 12, the pivoting platforms C1 allow the platform system B to go from one outer plane 51U to another outer plane 51U. Because the pivoting platform C1 has the same basic pattern of guide pins 54 mounted on its surface, the platform system B can be driven onto the pivoting platform. Once the platform system B rests fully onto the pivoting platform C, the combination of the platform system B and the pivoting platform C1 is pivoted 120 degrees, at which position the platform system B can transfer onto the adjacent plane 51U.

As shown in FIGS. 13 through 16, the procedure for traversing from an outer plane 51U to an inner plane 51L is the same as that for going from an outer plane 51U to another outer plane 51U, with the exceptions being an increase in the angle of rotation and an axial translation. After the platform system B is driven onto the pivoting platform C2, the combination of the pivoting platform C2 and the platform system B is pivoted 180 degrees. The same combination is then translated along the axis of rotation 40 to align the guide pins 54, whereupon the platform system B can transfer onto the inner plane 51L.

The foregoing disclosure and description of the invention are illustrative and explanatory thereof, and various changes in the size, shape and materials, as well as in the details of the illustrated construction may be made without departing from the spirit of the invention.

We claim:
1. A mobile remote manipulator system for the controlled movement of a load selectively in one of two orthogonal directions across a supporting planar surface, the invention comprising:
a plurality of guide pin means extending in a uniform pattern from the supporting planar surface for guiding movement in a plane parallel to and apart from the supporting planar surface; said guide pin means formed having a rail engagement end and a drive engagement portion;

a mobile platform having parallel first rail means and parallel second rail means for engaging the engagement end of said guide pin means; the longitudinal axes of said first rail means are alignable along the first of the two orthogonal directions of travel; and, the longitudinal axes of said second rail means are alignable along the second of the two orthogonal directions of travel;

said first rail means and said second rail means intersecting at essentially right angles to each other forming an essentially planar, movable track system;

node direction changing means located at each intersection of said first rail means and said second rail means for controllably directing the movement of said track system from one rail means to the second intersecting rail means;

at least one first propulsion means pivotally mounted on the first rail means for selectively engaging said drive engagement portion of said guide pin means that has been engaged by said first rail means and for moving said first rail means relative to the engaged guide pin means; said first propulsion means extends the length of the first rail means to continuously engage a guide pin means along the relative movement of the first rail means from one node direction changing means to the next node direction changing means;

at least one second propulsion means pivotally mounted on the second rail means for selectively engaging said drive engagement portion of said guide pin means that has been engaged by said second rail means and for moving said second rail means relative to the engaged guide pin means; said second propulsion means extends the length of the second rail means to continuously engage a guide pin means along the relative movement of the second rail means from one node direction changing means to the next node direction changing means; and, said first propulsion means and second propulsion means positioned in an overlapped manner such that either a first propulsion means or a second propulsion means can selectively engage a single guide pin means when such single guide pin means is positioned within the node direction changing means located at the intersection of the first rail means and the second rail means;

whereby the mobile platform may be moved along the supporting surface in either of the two orthogonal directions through the controlled coordination of said first propulsion means, said second propulsion means and said node direction changing means.

2. The invention of claim 1, wherein a plurality of the supporting surfaces are formed comprising:
a work structure having adjoining, planar segments forming working surfaces.

3. The invention of claim 1, wherein a plurality of the supporting surfaces are formed comprising:
a work structure having adjoining, essentially planar segments forming working surfaces; and,
at least one pivoting platform having a supporting surface with guide pin means extending from the supporting surfaces in said uniform pattern; said pivoting platform mounted at the intersection of two adjoining planar segments to pivot said supporting surface of said pivoting platform between alignment with the work surface of one planar segment and alignment with the work surface of the adjoining planar segment;

whereby, said moveable track grid can be driven onto said pivoting platform and transferred from one working surface to an adjacent working surface through pivoting of said platform.

4. The invention of claim 1, wherein said drive engagement portion of said guide pin means comprises:
a plurality of guide pin sprockets extending uniformly from the lower portion of said guide pin means.

5. The invention of claim 1, wherein said rail engagement end of said guide pin means comprises:
a shank portion having a flared head extending therefrom; and,
said first and second rail means comprise:
a rail having an essentially T-shaped cavity formed extending from one end to the opposite end of the length of said rail; said T-shaped cavity being complementary to said shank portion to engage and retain said bulbous head while the shank portion extends from the rail allowing movement of said rail engagement end of said guide pin means along the length of the rail.

6. The invention of claim 5, wherein said rail further includes a flared end for easy engagement of said guide pin means.

7. The invention of claim 5, wherein said node direction changing means includes:
a block formed having a complementary T-shaped cavity to engage said bulbous head of said guide pin means; and,
actuator means to controllably rotate said T-shaped cavity of said block between alignment with the T-shaped cavity formed in a first adjoining rail and alignment with the T-shaped cavity formed in a second adjoining rail, with the second adjoining rail positioned orthogonally to the first adjoining rail.

8. The invention of claim 1, wherein said first and said second propulsion means include:
a continuous belt drive complementary to said drive engagement means and mounted having a segment for positive engaging said drive engagement means of the guide pin means when engagement is desired; and,
reversible motor means for controllably rotating said continuous belt drive in either the forward or reverse directions.

9. The invention of claim 8, wherein said motor means rotates at a constant rate of speed.

10. The invention of claim 1, wherein the first propulsion means rotates into selective engagement with the guide pin means about an axis parallel to the longitudinal axis of the corresponding first rail means; and, the second propulsion means rotates into selective engagement with the guide pin means about an axis parallel to the longitudinal axis of the corresponding second rail means; whereby, either the first propulsion means or the second propulsion means is in engagement with the guide pin means, but not both propulsion means are engaged at one time.

11. The invention of claim 10, wherein the first and second rail means further include:
pivoted end portions to controllably pivot out of the path of the first or second propulsion means rotating into engagement with the guide pin means.

12. A mobile remote manipulator system for the controlled movement of a load selectively in one of two orthogonal directions across a supporting planar surface, the invention comprising:
- a plurality of guide pin means extending in a uniform pattern from said supporting planar surface for guiding movement in a plane parallel to and apart from the supporting planar surface;
- said guide pin means formed having a rail engagement end and a drive engagement portion, wherein said rail engagement end consists essentially of a shank portion having a flared head extending therefrom, and wherein said drive engagement portion consists essentially of a plurality of guide pin sprockets extending uniformly from the lower portion of said guide pin means;
- a mobile platform having parallel first rail means and parallel second rail means for engaging the engagement end of said guide pin means; the longitudinal axes of said first rail means are alignable along the first of the two orthogonal directions of travel; and, the longitudinal axes of said second rail means are alignable along the second of the two orthogonal directions of travel;
- said first rail means and said second rail means intersecting at essentially right angles to each other forming an essentially planar, movable track system;
- the first and second rail means each consisting essentially of a rail having an essentially T-shaped cavity formed extending from one end to the opposite end of the length of said rail; said T-shaped cavity being complementary to said shank portion of the drive pin means to engage and retain said bulbous head while the shank portion extends from the rail allowing movement of said rail engagement end of said guide pin means along the length of the rail;
- node direction changing means located at each intersection of said first rail means and said second rail means for controllably directing the movement of said track system from one rail means to the second intersecting rail means;
- said node direction changing means including a block formed having a complementary T-shaped cavity to engage said bulbous head of said guide pin means, and including actuator means to controllably rotate said T-shaped cavity of said block between alignment with the T-shaped cavity formed in a first adjoining rail and alignment with the T-shaped cavity formed in a second adjoining rail, with the second adjoining rail positioned orthogonally to the first adjoining rail;
- at least one first propulsion means pivotally mounted on the first rail means for selectively engaging said drive engagement portion of said guide pin means that has been engaged by said first rail means and for moving said first rail means relative to the engaged guide pin means; said first propulsion means extends the length of the first rail means to continuously engage a guide pin means along the relative movement of the first rail means from one node direction changing means to the next node direction changing means;
- at least one second propulsion means pivotally mounted on the second rail means for selectively engaging said drive engagement portion of said guide pin means that has been engaged by said second rail means and for moving said second rail means relative to the engaged guide pin means; said second propulsion means extends the length of the second rail means to continuously engage a guide pin means along the relative movement of the second rail means from one node direction changing means to the next node direction changing means; and,
- said first propulsion means and second propulsion means positioned in an overlapped manner such that either a first propulsion means or a second propulsion means can selectively engage a single guide pin means when such single guide pin means is positioned within the node direction changing means located at the intersection of the first rail means and the second rail means each having the propulsion means mounted;

whereby the mobile platform may be moved along the supporting surface in either of the two orthogonal directions through the controlled coordination of said first propulsion means, said second propulsion means and said node direction changing means.

13. The invention of claim 12, wherein a plurality of the supporting surfaces are formed comprising:
- a work structure having adjoining, planar segments forming working surfaces.

14. The invention of claim 12, wherein a plurality of the supporting surfaces are formed comprising:
- a work structure having adjoining, essentially planar segments forming working surfaces; and,
- at least one pivoting platform having a supporting surface with guide pin means extending from the supporting surfaces in said uniform pattern; said pivoting platform mounted at the intersection of two adjoining planar segments to pivot said supporting surface of said pivoting platform between alignment with the work surface of one planar segment and alignment with the work surface of the adjoining planar segment;

whereby, said moveable track grid can be driven onto said pivoting platform and transferred from one working surface to an adjacent working surface through pivoting of said platform.

15. The invention of claim 12, wherein said rail end further includes a flared end for easy engagement of said guide pin means.

16. The invention of claim 12, wherein said first and said second propulsion means include:
- a continuous belt drive complementary to said drive engagement means and mounted having a segment for positive engaging said drive engagement means of the guide pin means when engagement is desired; and,
- reversible motor means for controllably rotating said continuous belt drive in either the forward or reverse directions.

17. The invention of claim 16, wherein said motor means rotates at a constant rate of speed.

18. The invention of claim 12, wherein the first propulsion means rotates into selective engagement with the guide pin means about an axis parallel to the longitudinal axis of the corresponding first rail means; and, the second propulsion means rotates into selective engagement with the guide pin means about an axis parallel to the longitudinal axis of the corresponding second rail means; whereby, either the first propulsion means or the second propulsion means is in engagement with the guide pin means, but not both propulsion means are engaged at one time.

19. The invention of claim 18, wherein the first and second rail means further include:
- pivoted end portions to controllably pivot out of the path of the first or second propulsion means rotating into engagement with the guide pin means.

* * * * *